March 2, 1937.  K. PFEIFFER ET AL  2,072,380
POWER DRIVING DEVICE
Filed March 23, 1935   2 Sheets-Sheet 1

INVENTORS.
Karl Pfeiffer.
Seth T. Foresman.
Arthur H. Fries.
BY
Harness, Dind, Patee & Harris
ATTORNEYS.

March 2, 1937. K. PFEIFFER ET AL 2,072,380
POWER DRIVING DEVICE
Filed March 23, 1935 2 Sheets-Sheet 2
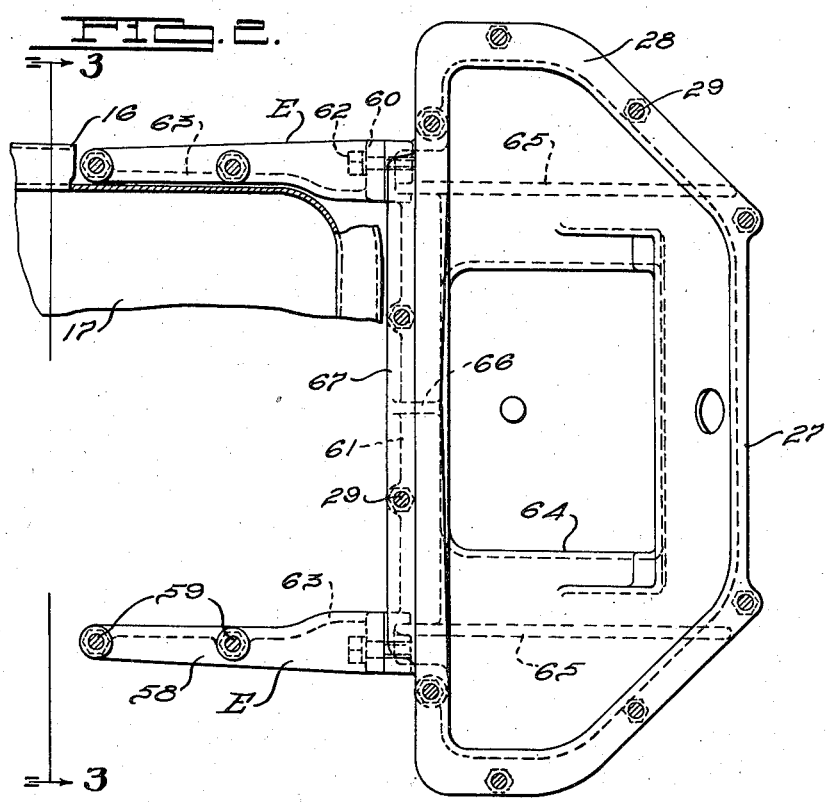
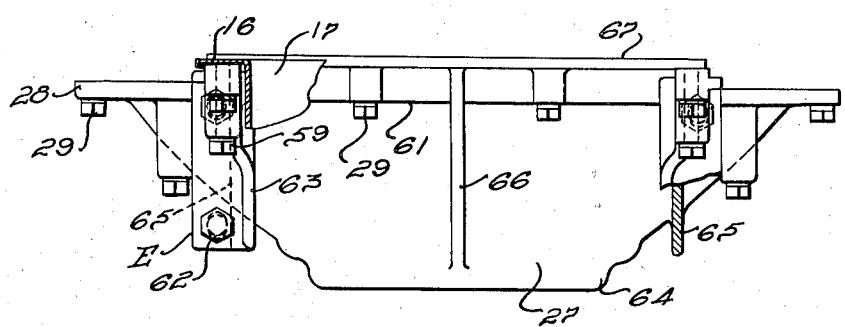
INVENTORS.
Karl Pfeiffer,
Seth T. Foresman,
BY Arthur H. Fries.
ATTORNEYS.

Patented Mar. 2, 1937

2,072,380

UNITED STATES PATENT OFFICE 2,072,380

POWER DRIVING DEVICE

Karl Pfeiffer, Detroit, Seth T. Foresman, Royal Oak, and Arthur H. Fries, Highland Park, Mich., assignors to Chrysler Corporation, Highland Park, Mich., a corporation of Delaware Application March 23, 1935, Serial No. 12,612

6 Claims. (Cl. 74—606)

This invention relates to power driving devices and refers more particularly to motor vehicle power drives especially of the type employing a change speed transmission and an auxiliary gearing such as an overdrive mechanism.

A power driving device of the character referred to is described in the co-pending applications of W. T. Dunn, Serial No. 707,047 filed January 18, 1934, E. R. Maurer, Serial No. 712,939, filed February 26, 1934, and O. E. Fishburn, et al., Serial No. 757,748 filed December 17, 1934.

In commercial use of such overdrive mechanisms it has been found that an objectionable vibration of unknown origin occurred in the mechanism, this vibration becoming very pronounced at certain speeds in the drive. This vibration has been referred to as "drumming" or "the overdrive beat" and in typical installations has proved most objectionable for motor vehicle driving speeds around 60 to 70 miles per hour. Considerable experimental and research work has been conducted to determine the origin of and cure for the overdrive beat but, so far as we are aware, the beat has never been successfully overcome prior to our said invention. Such experimental work included investigations of the engine balance, transmission vibrations, chassis frame and engine mounting, and other parts of the motor vehicle. While our early investigations along such lines lead to variations in the intensity of the beat and to the speed at which maximum beat intensity occurred, it was not until we made the subject invention that the beat was successfully eliminated as a practical matter.

It is therefore an object of our invention to provide a novel means and method for overcoming the aforesaid objectionable beat, in a simple, effective and inexpensive manner without altering the desired operation of the various parts of the power drive.

Further objects and advantages of our invention will be apparent from the following illustrative embodiment thereof, reference being had to the accompanying drawings, in which:

Fig. 2 is a sectional plan view taken along line 2—2 of Fig. 1 and illustrating our anti-drumming means for association with the engine and clutch housing.

Fig. 3 is a sectional elevational view of the Fig. 2 structure taken as indicated by line 3—3 of Fig. 2.

Figure 1:
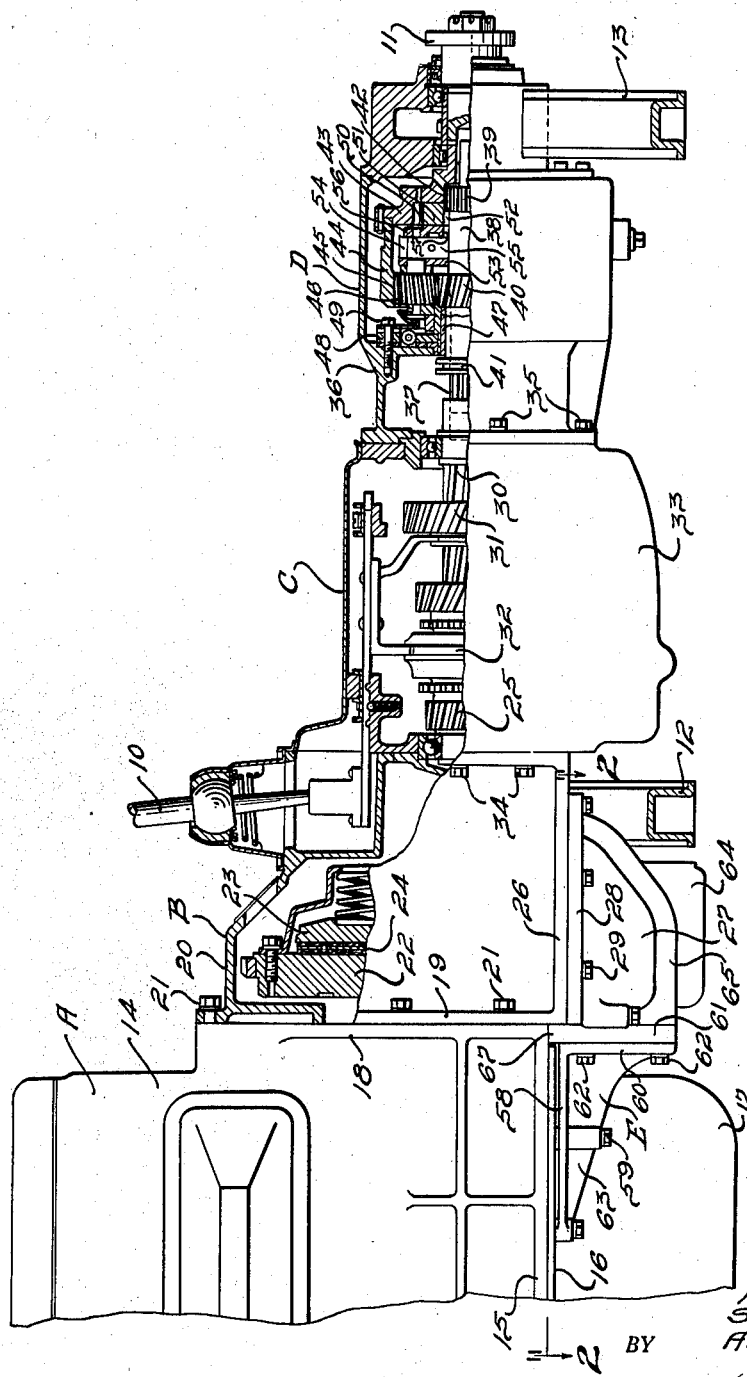
Fig. 1 is a side view partly in elevation and partly in section of a typical power driving device showing our invention applied thereto.

Referring to the drawings, reference character A represents an engine structure which may be of the well known type commonly used for driving motor vehicles. Projecting rearwardly from the engine and receiving the drive therefrom is the clutch structure B which, for the most part, may be of any desired or well known type. Projecting rearwardly from the clutch structure is the speed ratio changing structure or transmission C herein illustrated as the well known sliding gear type adapted for manual control by the usual gear shift lever 10. Projecting rearwardly from the transmission and receiving the drive therefrom is the overdrive structure D, a driven shaft 11 being adapted to drive the rear ground wheels of the motor vehicle in any desired or well known manner.

The power driving assembly illustrated in Fig. 1 is adapted to be appropriately mounted on the motor vehicle supporting frame structure, the latter being omitted in our drawings. Transverse supporting members may be provided by suitable points longitudinally of the power driving mechanism, two of such supports being illustrated at 12 and 13, respectively, between the clutch and transmission structures B and C, and rearwardly of the overdrive structure D.

Before describing the details of our improvements for preventing the overdriving "drumming" or beat, we will briefly outline the general operation of the power driving structures so that their functions may be recognized in conjunction with our improvements.

The engine A is provided with the usual cylinder block casting 14 having the bottom flange 15 adapted to receive the flange 16 of the crank case oil pan 17. The cylinder block 14 is further provided with a rear flanged face 18 for receiving the forwardly projecting flange 19 of the main body portion of the clutch housing 20, suitable fasteners 21 being employed to secure the clutch structure B to the engine structure A.

The engine flywheel 22 cooperates with the clutch pressure plate 23 to drive the clutch disc 24 in the well-known manner, the drive passing rearwardly to the usual transmission countershaft main driving gear 25. The clutch housing 20 is provided with a lower flange 26 bounding the usual opening in the bottom of the clutch housing, the opening being normally closed by a clutch housing cover 27 which has the upper flange 28 secured by fasteners 29 to the flange 26 of the clutch housing 20. The cover 27 may be a relatively heavy sheet metal stamping but preferably is a cast structure, the details of which will be more particularly hereinafter described.

Referring now to the transmission C, the drive passes therefrom rearwardly to the overdrive structure D by reason of the transmission drive shaft 30, this drive shaft being selectively driven at varying speed ratios with respect to the driving gear 25 by manual control of the gear shift lever 10 operating on the low and reverse speed selector gear 31 or on the shiftable second and direct speed clutch member 32 in the well known manner. The transmission is provided with a housing 33 which may be secured at the forward end thereof by fasteners 34 to the clutch housing 20 and rearwardly thereof by fasteners 35 to the housing 36 of the overdrive structure D.

The general type of overdrive structure illustrated in Fig. 1 is fully described in the aforesaid co-pending Maurer application and will only be very briefly referred to herein. The transmission drive shaft 30 has a sliding splined connection at 37 with the extension driving shaft 38 which carries the driving clutch teeth 39, the shaft 38 freely extending through a sun gear 40 and being adapted for axial manual shifting adjustment by reason of the shifting collar 41 secured to shaft 38.

The driven shaft 11 has a forwardly extending projecting structure comprising clutch teeth 42 illustrated in Fig. 1 in driving engagement with teeth 39, the driven shaft also being provided with the outer or driven overrunning clutch member 43 and being further provided with a cylindrical portion 44 formed with an internal gear 45 meshing with a series of planetary gears one of which is illustrated at 46, the latter also meshing with the sun gear 40. This sun gear is fixed through a hub 47 and plates 48 to the casing structure 36 by reason of suitable fasteners 49.

The overrunning clutch rollers 50 are operated by an inner driving cam member 51 having driving clutch teeth 52 illustrated in Fig. 1 as also engaging the clutch teeth 39. The planetary gears 46 are provided with a carrier 53 formed with one of two companion structures of an automatic clutch, the arrangement illustrated in Fig. 1 showing the carrier 53 provided with a cylindrical flange having circumferentially spaced slots one of which is illustrated at 54 adapted, under proper driving conditions, to receive the centrifugally operated pawl 55 of the companion automatic clutch structure 56, the latter having the internal driving teeth 57 adapted for engagement with the aforesaid teeth 39 of shaft 38. The type of automatic clutch illustrated in Fig. 1 is described in detail in the aforesaid co-pending Maurer application and for the purposes of our present disclosure it may be stated that with the clutch teeth 39 shifted forwardly to engage teeth 52 and 57, when the speed of the driven shaft is sufficient together with the speed of the driving shaft 38 to cause the pawls 55 to be thrown outwardly by the action of centrifugal force, the pawls 55 will engage the slots 54 in response to approximate synchronization in the speeds thereof which may be produced by momentarily slowing down the driving shaft 38 and allowing the driven shaft 11 to overrun through the action of the overrunning rollers 50.

With the driving shaft 38 in the position illustrated in Fig. 1 it will be apparent that the pawls 55 of the automatic clutch are not being driven since the shiftable driving teeth 39 are in engagement with the teeth 52 of the inner free wheeling cam 50 and also with the teeth 42 of the driven shaft 11. In such position therefore a direct two-way drive will be transmitted from driving shaft 38 to driven shaft 11.

With the shaft 38 shifted forwardly by collar 41 to engage teeth 39 with teeth 52 and 57, it will be apparent that a direct one-way drive will be transmitted from shaft 38 to driven shaft 11 and that under such conditions when the pawls 55 are driven at or above their critical speed, the overdrive mechanism may be brought into operation by a reduction in the speed of shaft 38 to synchronize the rotational speed of the slots 54 and pawls 55. Prior to clutch engagement the ratio provided by the planetary gearing is such that the slots 54 are driven at a slower speed than the pawls 55, this reduction gear train providing an overdrive when the automatic clutch engages, in which case the drive passes from shaft 38 to shaft 11 through the automatic clutch, planetary gearing and cylindrical member 44.

The power driving mechanism as thus far described including the overdrive structure D in association with the engine, clutch and transmission structures A, B and C, respectively, give rise to the aforesaid objectionable overdrive beat or drumming which is an inherent characteristic of this driving mechanism. We have determined that this drumming tendency may be overcome by the provision of a stiffening or bracing structure preferably located generally between the engine and clutch structures. One embodiment of our invention is illustrated in the drawings and will now be described in detail.

Extending below the engine cylinder block flange 15 at each side of the engine and adjacent the rear end thereof, we have provided a bracing member E formed with an upper flange 58 adapted to seat against a flange 15 preferably with the oil pan flange 16 secured therebetween, suitable fasteners 59 being employed for this purpose. Each bracket E is substantially L-shaped, being provided with a downwardly extending rear flange 60 contacting with a forward flange 61 of the clutch housing cover 27 and secured thereto by the fasteners 62. If desired the brackets E may be formed integrally with the cover 27 although our illustrated arrangement is somewhat preferred from the standpoint of facilitating manufacture and assembly of the power driving mechanism.

Extending between the right angularly arranged flanges 58 and 60 of each bracket E is a rib or web 63 formed as a part of the brace. It will thus be noted that the braces E extend longitudinally of the power driving mechanism at each side of the engine structure A preferably in longitudinal alignment with companion webs or ribs formed with the cover 27 to provide therewith a rigid bracing or back-bone structure for the power driving mechanism.

The clutch housing cover 27 is provided with the central flywheel receiving depression 64 and extending longitudinally adjacent this depression is a rib 65 which connects the right angularly arranged flanges 61 and 28, each rib 65 being substantially longitudinally aligned with a rib 63 and thus forming a continuation thereof through flanges 60 and 61. The cover 27 may be provided with a further relatively short rib 66 extending forwardly from the depression 64 to flange 61 and lying approximately in the vertical plane containing the longitudinal axis of the power driving mechanism.

In the illustrated arrangement it will be noted that the upper portion of flange 61 pilots at 67 against the lower face of the engine rear flange 18 and also rearwardly against the forward lower portion of the clutch housing flange 19. With the bracing structure as thus illustrated and described we have successfully eliminated the objectionable inherent characteristic or tendency to set up the so called drumming or overdrive beat. If desired the casings 33 and 36 of the respective transmission and overdrive structures C and D may be integrally formed. It will be observed that the longitudinally aligned braces or ribs 63 and 65 cooperate to provide a truss-like bracing structure extending between the engine and clutch structures A and B.

We further desire to point out that our bracing means effectively prevents occurrence of critical vibrations in the power driving mechanism from propeller shafts which may be slightly out of balance, such bracing means being desirable therefore even when the driving mechanism does not include an overdrive unit D, especially in installations having relatively long propeller shafts driven in the well known manner from shaft 11.

We claim:

1. In a drive for a motor vehicle including an engine structure, a clutch structure projecting rearwardly from the engine structure, a speed ratio changing structure projecting rearwardly from said clutch structure, and an overdrive structure projecting rearwardly from said speed changing structure, said clutch structure including a housing and a bottom cover therefor, means for dampening drumming tendency of said overdrive structure and including a longitudinally extending stiffening rib projecting downwardly from said clutch housing cover.

2. In a drive for a motor vehicle including an engine structure, a clutch structure projecting rearwardly from the engine structure, a speed ratio changing structure projecting rearwardly from said clutch structure, and an overdrive structure projecting rearwardly from said speed changing structure, said clutch structure including a housing and a bottom cover therefor, means for dampening drumming tendency of said overdrive structure and including a longitudinally extending stiffening rib projecting downwardly from said clutch housing cover, and a second longitudinally extending stiffening rib secured to said engine structure and projecting downwardly therefrom adjacent said first rib.

3. In a drive for a motor vehicle including an engine structure, a clutch structure projecting rearwardly from the engine structure and secured thereto, a speed ratio changing structure including a housing therefor projecting rearwardly from said clutch structure, an overdrive structure projecting rearwardly from said speed ratio changing structure, said clutch structure including a housing and a bottom cover therefor disposed intermediate said engine structure and the housing of said speed ratio changing structure, means for attaching said bottom cover as a unit to the housing of said clutch structure independently of the housing for said speed ratio changing structure, and a longitudinally extending stiffening rib rigidly carried by a rear end portion of said engine structure and projecting downwardly therefrom adjacent said bottom cover, said bottom cover and said stiffening rib being structurally united to provide a truss-like structure between said engine structure and clutch housing and being so constructed and arranged as to dampen the drumming tendency of said overdrive structure.

4. In a drive for a motor vehicle including an engine structure, a clutch structure projecting rearwardly from the engine structure and secured thereto, a speed ratio changing structure including a housing therefor projecting rearwardly from said clutch structure, an overdrive structure projecting rearwardly from said speed ratio changing structure, said clutch structure including a housing and a bottom cover therefor disposed intermediate said engine structure and the housing of said speed ratio changing structure, means for attaching said bottom cover as a unit to the housing of said clutch structure independently of the housing for said speed ratio changing structure, a longitudinally extending stiffening rib rigidly carried by a rear end portion of said engine structure and projecting downwardly therefrom adjacent said bottom cover, said bottom cover and said stiffening rib being structurally united to provide a truss-like structure between said engine structure and clutch housing and being so constructed and arranged as to dampen the drumming tendency of said overdrive structure, said engine structure including a main body and a bottom pan, and common means securing said bottom pan and said stiffening rib to said main body of said engine structure.

5. In a power plant drive for a motor vehicle having a supporting frame structure, an engine structure, a clutch housing structure projecting rearwardly from the engine structure, a transmission housing structure projecting rearwardly from said clutch housing structure, an overdrive mechanism and housing therefor rigidly structurally connected to the rear of said transmission housing structure, means rigidly connecting said clutch housing structure to the engine structure and to the transmission housing structure independently of said motor vehicle supporting frame structure whereby said engine structure, clutch housing structure, transmission housing structure and overdrive housing are rigidly connected together to provide a unitary power plant, and means for dampening drumming tendency of said power plant originating in said overdrive mechanism comprising bracing means rigidly connecting the lower part of said engine structure with one of said housing structures independently of said motor vehicle supporting frame structure.

6. In a power plant drive for a motor vehicle having a supporting frame structure, an engine structure, a clutch housing structure projecting rearwardly from the engine structure, a transmission housing structure projecting rearwardly from said clutch housing structure, an overdrive mechanism and housing therefor rigidly structurally connected to the rear of said transmission housing structure, means rigidly connecting said clutch housing structure to the engine structure and to the transmission housing structure independently of said motor vehicle supporting frame structure whereby said engine structure, clutch housing structure, transmission housing structure and overdrive housing are rigidly connected together to provide a unitary power plant, and means for dampening drumming tendency of said power plant originating in said overdrive mechanism comprising bracing means rigidly connecting the lower part of said engine structure with said clutch housing structure independently of said motor vehicle supporting frame structure.

KARL PFEIFFER.
SETH T. FORESMAN.
ARTHUR H. FRIES.